US012723616B2

(12) United States Patent
Englebright et al.

(10) Patent No.: US 12,723,616 B2
(45) Date of Patent: Sep. 1, 2026

(54) SOCKET JOINT SPACER

(71) Applicant: FEDERAL-MOGUL MOTORPARTS LLC, Southfield, MI (US)

(72) Inventors: Seth Englebright, Festus, MO (US); Roger Sellers, Arnold, MO (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 257 days.

(21) Appl. No.: 18/620,184

(22) Filed: Mar. 28, 2024

(65) Prior Publication Data

US 2025/0305537 A1 Oct. 2, 2025

(51) Int. Cl.
*F16C 11/06* (2006.01)

(52) U.S. Cl.
CPC ...... *F16C 11/0623* (2013.01); *F16C 2326/05* (2013.01); *F16C 2326/24* (2013.01)

(58) Field of Classification Search
CPC ... F16C 11/06; F16C 11/0619; F16C 11/0623; F16C 11/0652; F16C 11/0666; F16C 11/0671; F16C 11/0685; F16C 2326/05; F16C 2326/24; F16F 1/32; F16F 1/328; Y10T 403/32737; Y10T 403/32754
See application file for complete search history.

(56) References Cited

U.S. PATENT DOCUMENTS

| | | | | |
|---|---|---|---|---|
| 5,154,530 | A | 10/1992 | Dresselhouse | |
| 6,832,675 | B2 * | 12/2004 | Kao | F16D 13/583 192/52.4 |
| 6,840,697 | B1 | 1/2005 | Dorr | |
| 8,454,290 | B2 | 6/2013 | Schaser et al. | |
| 8,764,336 | B2 | 7/2014 | Kraatz | |
| 8,875,683 | B2 | 11/2014 | Holt et al. | |
| 10,359,071 | B2 * | 7/2019 | Parker | F16C 11/0671 |
| 10,473,147 | B2 * | 11/2019 | Kopsie | F16C 11/0685 |
| 10,544,825 | B2 * | 1/2020 | Parker | F16C 11/0628 |
| 10,711,830 | B2 * | 7/2020 | Englebright | F16C 11/08 |
| 11,149,783 | B2 | 10/2021 | Schmidt | |
| 11,795,994 | B1 * | 10/2023 | Schmidt | F16C 11/0647 |
| 2006/0140712 | A1 * | 6/2006 | Sun | F16C 11/0628 403/135 |
| 2018/0149190 | A1 | 5/2018 | Henriksen | |
| 2023/0258225 | A1 | 8/2023 | Schmidt | |

FOREIGN PATENT DOCUMENTS

| | | | | |
|---|---|---|---|---|
| CA | 2510440 | A1 * | 12/2005 | F16C 11/0671 |
| DE | 102009043115 | A1 * | 5/2010 | F16C 11/0671 |
| DE | 10204277 | B4 | 3/2012 | |
| EP | 2148109 | A1 * | 1/2010 | F16D 41/067 |
| GB | 790781 | A * | 2/1958 | F16B 43/00 |
| KR | 100752619 | B1 | 8/2007 | |

* cited by examiner

*Primary Examiner* — Jonathan P Masinick
(74) *Attorney, Agent, or Firm* — Reising Ethington P.C.

(57) ABSTRACT

A spacer for a socket joint includes a plurality of dimples to help promote a more strategic telescoping crush when installed. The body of the spacer has a plurality of radial vectors extending radially from the inner diameter to the outer diameter. The body includes a first set of dimples with one or more dimples projecting in a first direction from the body, and a second set of dimples with one or more dimples projecting in a second direction from the body. The first direction is different from the second direction, and a first dimple from the first set of dimples and a second dimple from the second set of dimples are at least partially aligned along one radial vector of the plurality of radial vectors.

11 Claims, 5 Drawing Sheets

SOCKET JOINT SPACER

TECHNICAL FIELD

This disclosure generally relates to vehicle components and, in particular, to socket joints used in steering and suspension systems.

BACKGROUND

Managing stack up tolerances in socket joints can sometimes be a challenge. Maintaining a set preload is desirable, but stack up tolerances may undesirably impact the set preload. Spacers can be used to impact the preload, but oftentimes, the design of the spacer fails to more precisely control the preload and can lead to stack up tolerances. The spacer embodiments disclosed herein can be used to reduce or eliminate the stack up tolerances in a socket joint assembly to set the preload device (e.g., a Belleville washer) to a set height.

Additionally, the spacer embodiments disclosed herein may help with dust boot retention. Many internal/integrated dust boots require a metal or plastic insert around the base of the boot where it mates with the housing to hold it in the housing and resist it being pulled out when other components such as studs, bushings, brackets, etc. that are used in the assembly are pushed through it. The spacer embodiments disclosed herein may be used to help ameliorate some of these retention related difficulties.

SUMMARY

According to one embodiment, there is provided a spacer for a socket joint comprising a body extending from an inner diameter to an outer diameter. The body has a plurality of radial vectors extending radially from the inner diameter to the outer diameter. The body includes a first set of dimples with one or more dimples projecting in a first direction from the body, and a second set of dimples with one or more dimples projecting in a second direction from the body. The first direction is different from the second direction, and a first dimple from the first set of dimples and a second dimple from the second set of dimples are at least partially aligned along one radial vector of the plurality of radial vectors.

In some embodiments, the first direction is a first axial direction and the second direction is a second axial direction, with the first axial direction and the second axial direction being opposite directions.

In some embodiments, the first set of dimples forms a first waveform profile and the second set of dimples forms a second waveform profile, with the first waveform profile and the second waveform profile being at least partially offset. The body has a maximum axial height between a peak of the first dimple and a valley of the second dimple, and a bisecting circumferential line extends around the body circumferentially at a midpoint of the maximum axial height.

In some embodiments, the first set of dimples comprises alternating first arc length extensions and second arc length extensions, and the second set of dimples comprises alternating third arc length extensions and fourth arc length extensions. The third and fourth arc length extensions are longer than the first arc length extensions. The first and second arc length extensions open in a first radial direction, and the third and fourth arc length extensions open in a second opposing radial direction.

In some embodiments, the body includes a plurality of tabs that extend from the outer diameter.

A socket joint may comprise the spacer, with the spacer being compressed between a first internal subcomponent and a second internal subcomponent, the spacer having first spaced contact portions contacting the first internal subcomponent and second spaced contact portions contacting the second internal subcomponent. The first spaced contact portions and the second spaced contact portions are aligned along at least some radial vectors of the plurality of radial vectors.

A dust boot having a flange can have the spacer at least partially embedded in the flange.

In accordance with another embodiment, there is provided a spacer for a socket joint comprising a body extending from an inner diameter to an outer diameter. A first waveform profile is located toward the inner diameter of the body, and a second waveform profile is located toward the outer diameter of the body. The first waveform profile and the second waveform profile are at least partially offset.

In some embodiments, the body has a maximum axial height, the maximum axial height being an amplitude between a peak and a valley of the first waveform profile or the second waveform profile. A bisecting circumferential line extends around the body circumferentially at a midpoint of the maximum axial height, and each of the first and second waveform profiles can include a continuously changing curve. A slope of the continuously changing curve is greatest at the bisecting circumferential line.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The socket joints and spacers described herein can help control stack up tolerances within the assembly, and in some embodiments, can improve the seal of the dust boot. As opposed to spacers that have a more standard, singular waveform profile, the spacers of the present disclosure include complex waveform profiles comprising an advantageous dimple structure that can help to impart a more strategic telescoping crush performance when installed in a socket joint.

Figure 1:
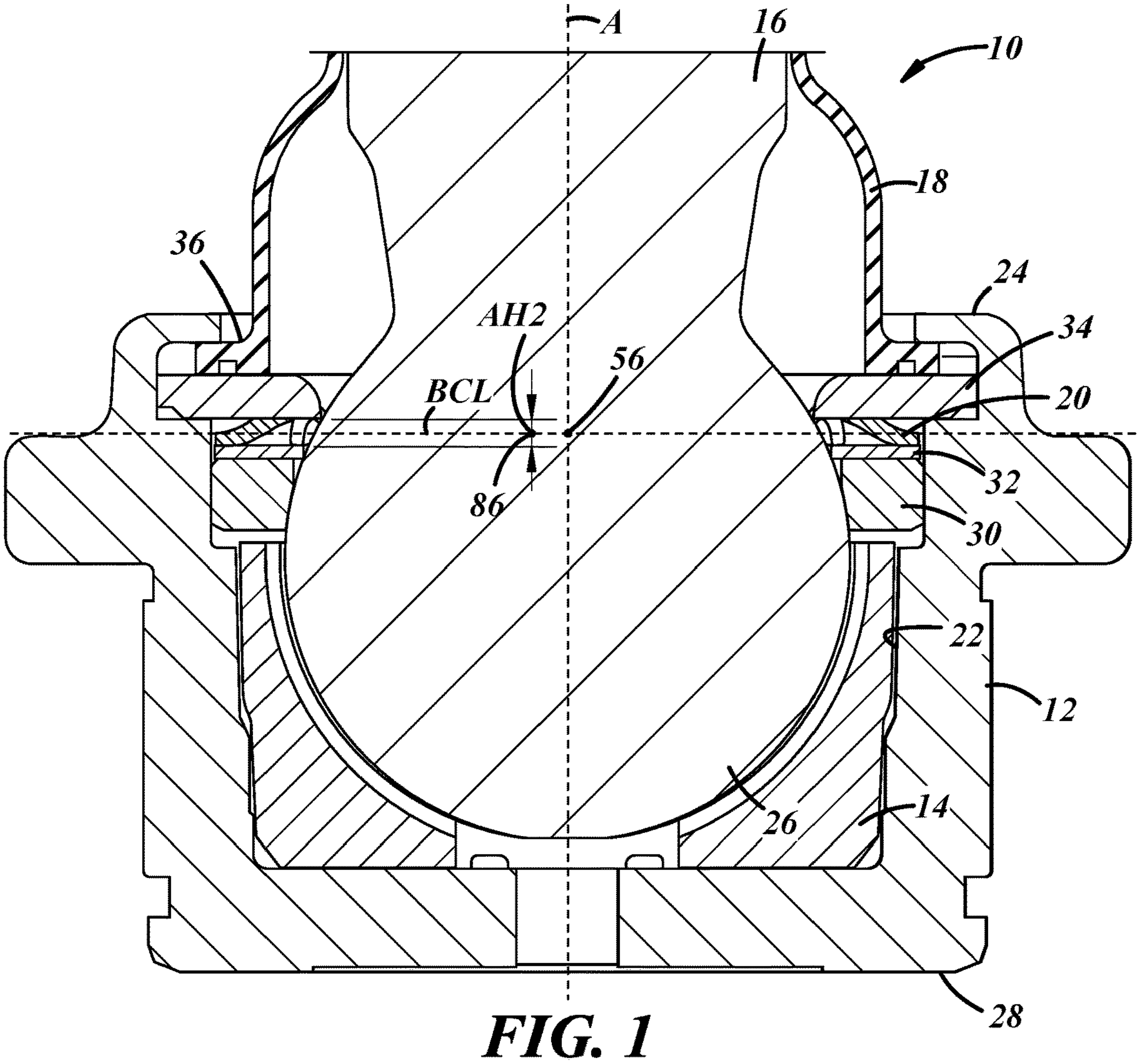
FIG. 1 is a cross-section view of a socket joint and spacer according to one embodiment.
Figure 2:
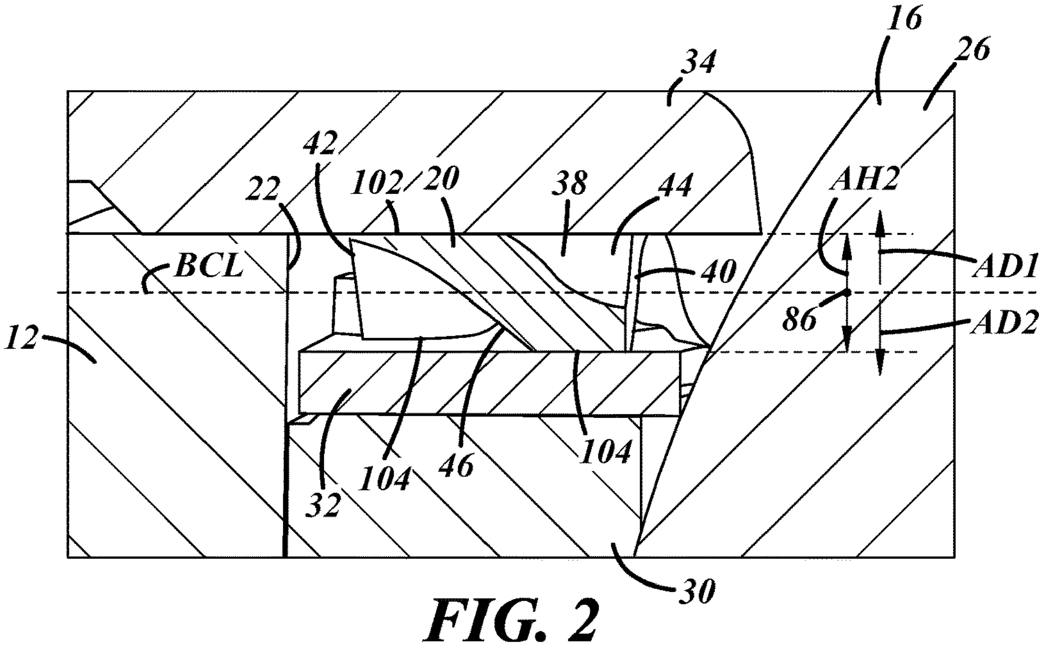
FIG. 2 is an enlarged view of a portion of the socket joint of FIG. 1.

FIGS. 1 and 2 show partial views of a socket joint 10. The socket joint 10 includes a housing 12 at least partially surrounding an end bearing 14 and a stud 16. A dust boot 18 and a spacer 20 are located in a bore 22 toward an exit side 24 of the housing 12. The stud 16 in this embodiment includes a ball 26 located proximate an end side 28 of the housing 12. Other features may also be included, including an exit bearing 30, a preload such as a Belleville washer 32, and one or more other spacing rings 34. Accordingly, in the illustrated embodiment, internal subcomponents of the joint 10 include the end bearing 14, the stud 16, the exit bearing 30, the Belleville 32, the spacing ring 34, and the dust boot 18. Generally, as used herein, an internal subcomponent includes a part of the socket joint 10 that is at least partially housed within the bore 22 of the housing 12. Other features may also be included as internal subcomponents, such as a cover plate or other operational-based features depending on the desired use and placement of the joint 10 within a vehicle steering and suspension system. Additionally, some of the internal components shown in the illustrated embodiment may not be present in other embodiments, or may take a different form. For example, the preload 32 may not be a Belleville, or the spacing ring 34 may be omitted if the flange 36 of the dust boot 18 is more rigid, to cite a few examples.

The housing 12 is a generally circular cylindrical component that surrounds the internal subcomponents of the joint 10. In the illustrated embodiment, the spacer 20 is situated directly between the Belleville 32 and the spacing ring 34. However, it is possible for the spacer 20 to be situated in other portions within the bore 22 of the housing 12. For example, the spacer 20 may be located closer to the end side 28 of the housing 12, or as described further in relation to FIGS. 9 and 10, may be at least partially embedded in the flange 36 of the dust boot 18. Other technically feasible locations within the bore 22 of the housing 12 are certainly possible.

Figure 3:
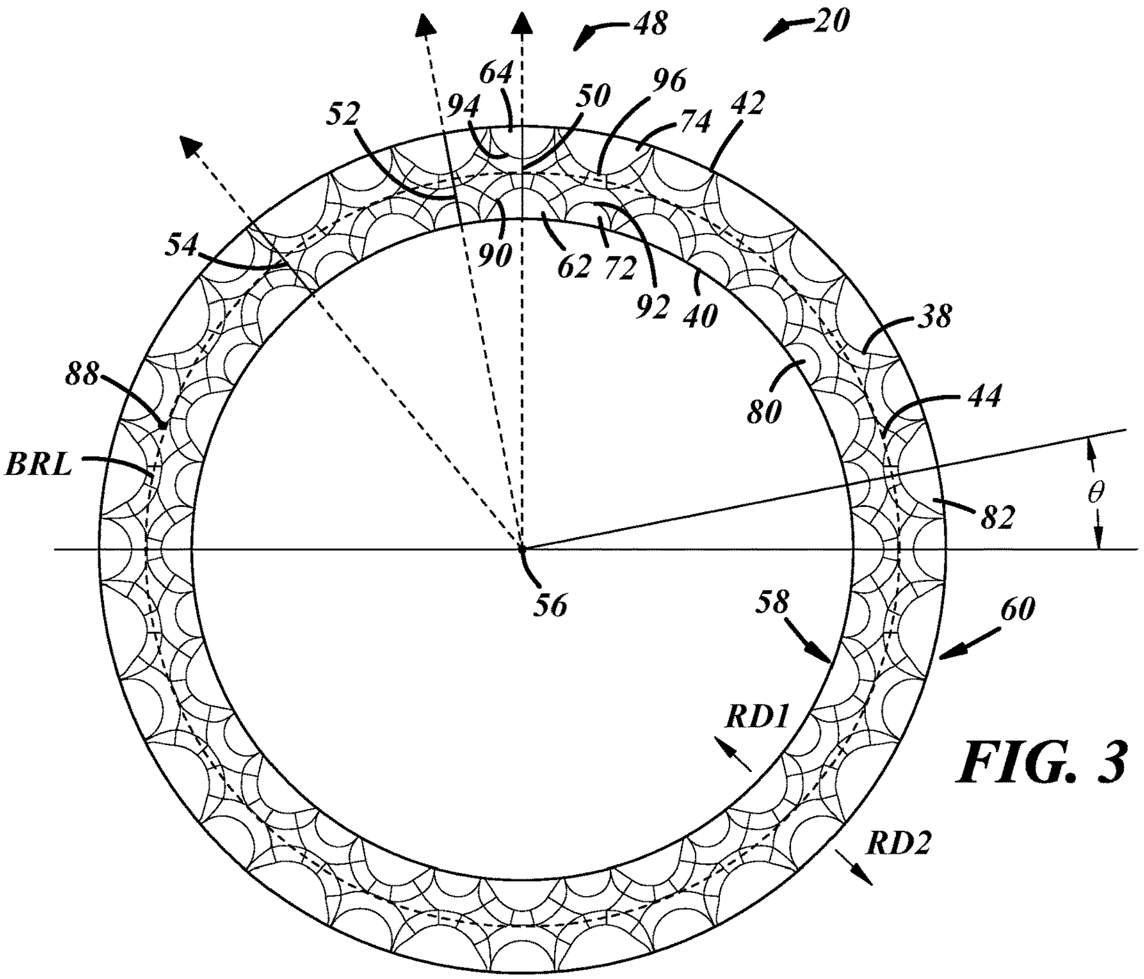
FIG. 3 is a top view of one embodiment of a spacer.
Figure 4:
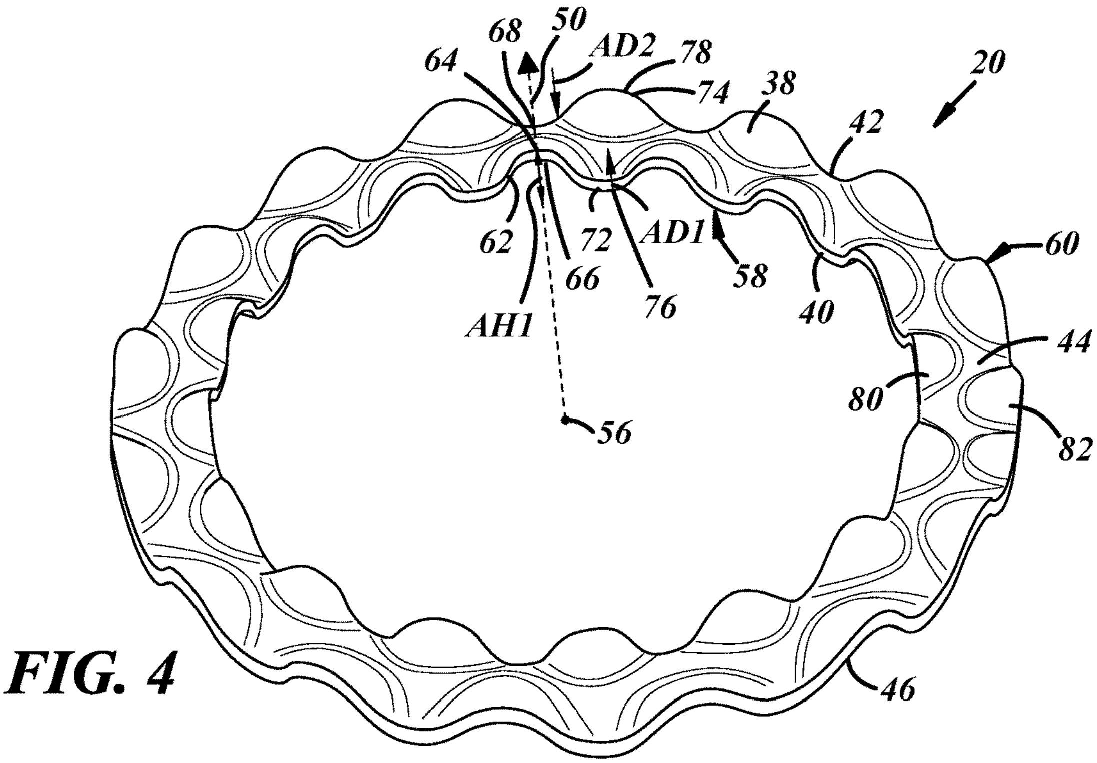
FIG. 4 is a perspective view of the spacer of FIG. 3 before it is crushed.

With particular reference to FIGS. 3 and 4, the spacer 20 includes a body 38 that extends from an inner diameter 40 to an outer diameter 42. The body 38 of the spacer 20 is predominantly radially oriented between the inner diameter 40 and the outer diameter 42. As used herein, axial or axially extending/oriented means generally parallel to the axis A (+/−5 deg.), and radial or radially extending/oriented means generally orthogonal with respect to the axis A (+/−5 deg.). For components, surfaces, etc. that are described as radially or axially extending, only a portion thereof need to be radially or axially extending, respectively.

The body 38 of the spacer 20 includes an exit side 44 and an opposing end side 46. The exit side 44 and the end side 46 generally coincide with the exit side 24 and the end side 28 of the housing 12, respectively. It should be understood, however, that it is possible for the exit side 44 and the end side 46 to be essentially interchangeable (i.e., the orientation in which the spacer 20 is installed within the bore 22 of the housing 12 does not matter). Alternatively, in other embodiments, the exit side 44 and the end side 46 may be configured to impart different crush characteristics such that the orientation within the bore 22 of the housing 12 impacts the crush performance. Additionally, one or more slots and/or apertures may be included in the body 38 to help with machinability and/or otherwise impact the crush performance.

In the illustrated embodiments, the body 38 is made from a metal-based material. In a particular implementation, the body 38 is made from cold rolled 1008/1010 steel. However, other metal-based materials are certainly possible, such as aluminum to cite another example. In yet other embodiments, a more plastic material may be used (e.g., a reinforced non-metal-based material), but metal is generally preferred with the socket joint 10. The material may be chosen depending on the load range that is desired. The shape of the body 38 may be stamped or otherwise formed to help impart a telescopic crush ability.

With particular reference to FIG. 3, although applicable to other embodiments as well, given the rounded or circular shape of the body 38, there are a plurality of radial vectors 48. Only a few radial vectors 50, 52, 54 are labeled for clarity purposes. In theory, a radial vector field with origin 56 comprising the plurality of radial vectors 48, would constitute a ring array of an infinite number of radial vectors 50, 52, 54, with the origin being the center point of the inner diameter 40 and outer diameter 42 in this embodiment. Accordingly, each radial vector 50, 52, 54 of the plurality of radial vectors 48 comprises a straight line emanating radially outward from the origin 56 and through the body 38 between the inner diameter 40 and the outer diameter 42. As shown in FIG. 1, in this embodiment, the origin 56 is located along the axis A.

Figure 5:
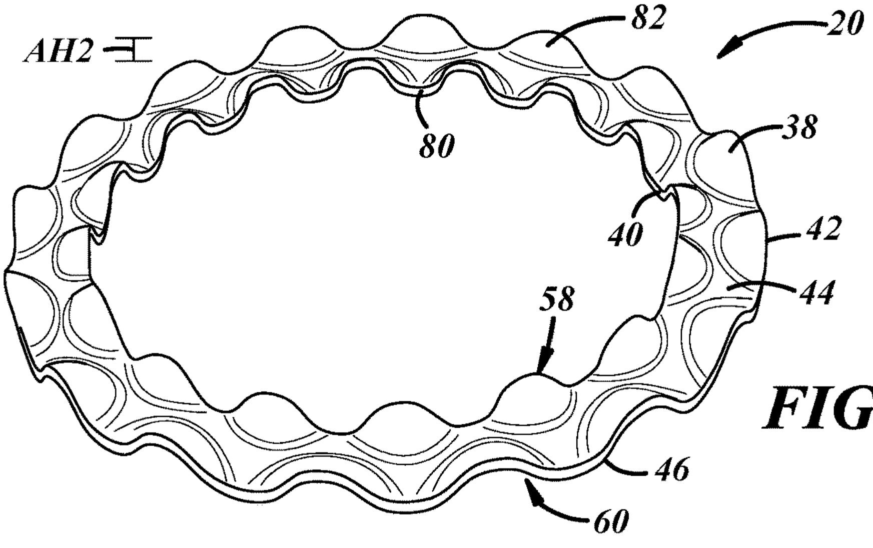
FIG. 5 is a perspective view of the spacer of FIGS. 3 and 4 showing an example minimum crush level upon installation.
Figure 6:
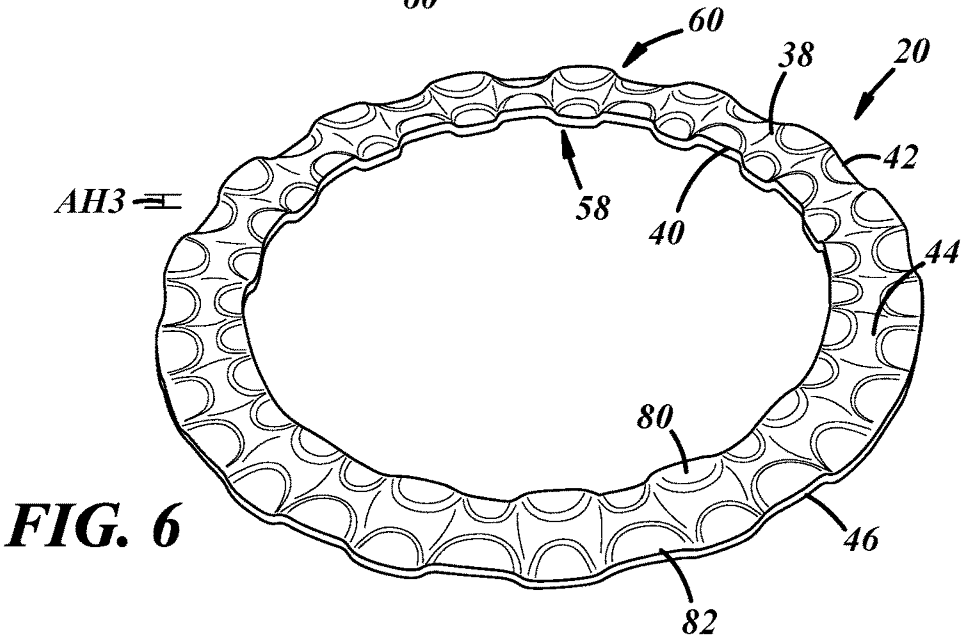
FIG. 6 is a perspective view of the spacer of FIGS. 3-5, showing an example maximum crush level upon installation.

With particular reference to FIGS. 3-8, but applicable to other embodiments as well, the body 38 includes a first set of dimples 58 that is located toward the inner diameter 40 and a second set of dimples 60 that is located toward the outer diameter 42. In this embodiment, both the first set of dimples 58 and the second set of dimples 60 include a plurality of dimples extending in alternate directions around the circumference of the spacer 20. The sets of dimples 58, 60 are strategically arranged to create a telescopic crushing effect, as schematically illustrated in FIGS. 4-6. This telescopic crushing effectuated by the alternating dimple structure when comparing the inner diameter 40 and the outer diameter 42 can improve stack up tolerance control better than more simplistic waveform structures, for example. Additionally, the telescopic crushing from the alternating, dual dimple structure can strategically influence the load transfer during manufacture.

As shown in FIG. 4, the first set of dimples 58 includes a first dimple 62 located along the radial vector 50 and the second set of dimples 60 includes a second dimple 64 that is also located along the radial vector 50. In this embodiment, the first dimple 62 and the second dimple 64 are exactly aligned (bisected by) the radial vector 50, but in other embodiments, only a portion of each dimple 62, 64 may be aligned along the radial vector 50. As illustrated, the first dimple 62 extends in a first direction AD1 up from the exit side 44 of the spacer 20, toward the exit side 24 of the housing 12. The second dimple 64 extends in a second direction AD2 down from the end side 46 of the spacer 20, toward the end side 28 of the housing 12. In the illustrated embodiments, the first and second directions AD1, AD2 are opposing axial directions such that the radially aligned dimples of the first set 58 and the second set 60 extend in opposite directions. In other embodiments, the dimples of set 58 and/or set 60 may extend out from the body 38 at other directions (e.g., at 45°, to cite one example).

Figure 8:
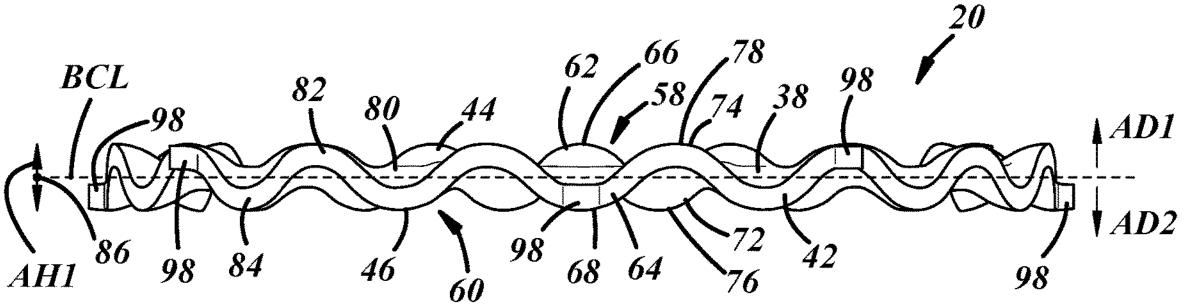
FIG. 8 is a side view of the spacer of FIGS. 1, 2, and 7.

FIG. 8 shows the alternating dimple structure more clearly, with the first dimple 62 including a peak 66 and the second dimple 64 including a valley 68. In this embodiment, each dimple 62, 64 includes an adjacent dimple 72, 74, respectively, that has an opposite configuration. Accordingly, the first dimple 62 has a peak 66 and then the first adjacent dimple 72 has an adjacent valley 76. Similarly, the second dimple 64 has a valley 68 and then the second adjacent dimple 74 has an adjacent peak 78. It should be understood that in the illustrated embodiment, this alternating dimple structure within each of the first and second dimple sets 58, 60 extends around the entire circumference of the inner diameter 40 and the outer diameter 42, respectively, but only a few are labeled for clarity purposes. Moreover, the alternating dimple structure within each dimple set 58, 60 can help impart a more controlled telescopic crush quality.

In the illustrated embodiments, the alternating dimple structure can help to create a first waveform profile 80 located toward the inner diameter 40 of the body 38. Additionally, as opposed to standard, single waveform spacers, the spacer 20 includes a second waveform profile 82 which is located toward the outer diameter 42 of the body 38. As shown more particularly in FIG. 8, the first waveform profile 80 and the second waveform profile 82 are at least partially offset (e.g., the respective peaks 66, 78 and valleys 68, 76 of each waveform profile 80, 82 are not perfectly aligned when viewed from the side of the spacer 20). In the illustrated embodiments, the waveform profiles 80, 82 are offset in terms of phase, but they might be alternatively or additionally offset with respect to amplitude. More particularly, each waveform profile 80, 82, in an advantageous embodiment, has a sinusoidal or undulating structure, and even more particularly, may at least partially incorporate a continuously changing curve 84. The amount of offset between the two waveform profiles is 180° in the illustrated embodiment, which can help distribute the dimples more evenly across the body 38. Like a more sinusoidal structure, a continuously changing curve 84, which is more visible in the side views of the spacer 20, 20', has a slope that varies along the waveform profile 80, 82. This waveform profile 80, 82 structure can influence the load transfer through the spacer 20 more strategically.

An axial height AH of the body 38 of the spacer 20 can also be adjusted to modify the telescopic crush characteristics when installed in the socket joint 10. In the illustrated embodiments, the axial height AH of the body 38 is an amplitude between the peak 66 and the adjacent valley 76 of the first waveform profile 80. The axial height AH and the amplitude are the same when comparing the first waveform profile 80 and the second waveform profile 82. However, in other implementations, they could be different such that a smaller or larger axial height AH is located between the valley 68 and the adjacent peak 78.

FIGS. 4 and 8 show the spacer 20 at a maximum axial height AH1. The maximum axial height AH1 may be less than or greater than what is particularly illustrated, but more generally refers to the spacer 20 in an uncrushed state before installed in the socket joint 10. Additionally, as previously mentioned, it may be advantageous to include varying axial heights AH around a circumference of the body 38, and with such an embodiment, the maximum axial height AH1 may be taken at the outer diameter 42 at the adjacent peak/valley having the largest amplitude (AH varies in this embodiment between the inner diameter 40 and the outer diameter 42). The resulting amount of telescoping crush when the spacer 20 is installed will vary between a crush minimum axial height AH2 and a crush maximum axial height AH3, as shown in FIGS. 5 and 6, respectively. The degree of variability between AH1 and AH2/AH3 can be controlled to better manage stack up tolerances. In one example embodiment, a thickness of the body 38 between the exit side 44 and the end side 46 is about 0.034 inches. The maximum axial height AH1 at this uncrushed state was about 0.10 inches. Then, with reference to FIG. 5, the free height or maximum axial height AH1 was crushed by about 0.015 inches, resulting in a crush minimum axial height AH2 of 0.085 inches. For the maximum amount of deflection, the spacer 20 was crushed by about 0.058 inches, resulting in a crush maximum axial height AH3 of 0.042 inches. In some embodiments, the spacer 20 and the dimple profile may be adjusted to accommodate a 10% to 75% reduction in maximum axial height AH1 when crushed, or more advantageously, 15% to 50%. This amount can help eliminate stack up tolerances and set the preload device to a more controllable set height. Additionally, the thickness of the body 38, the material used for the body 38, and other operable features may be altered to adjust the desired reduction in maximum axial height AH1. Additionally, these particular dimensions may vary and be adjusted depending on the desired specifications of the socket joint 10.

Figure 7:
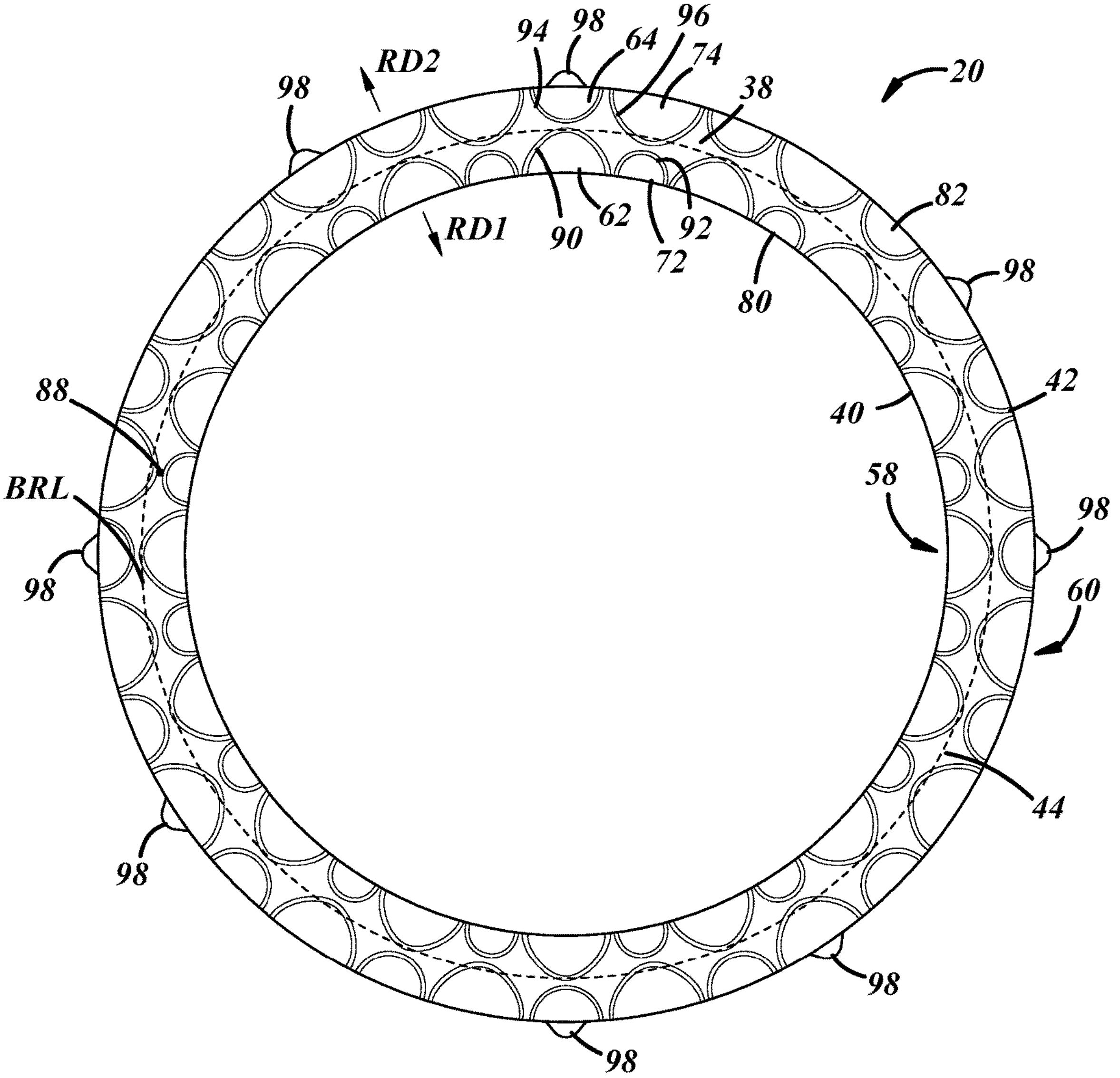
FIG. 7 is a top view of the spacer of FIGS. 1 and 2.

With reference to FIGS. 1, 2, and 8 in particular, a bisecting circumferential line BCL extends around the body 38 of the spacer 20 circumferentially at a midpoint 86 of the maximum axial height AH1 at the outer diameter 42. Additionally, as shown in FIGS. 3 and 7, a bisecting radial line BRL extends around the body 38 of the spacer at a midpoint 88 between the inner diameter 40 and the outer diameter 42. In the illustrated embodiments, the axial height AH is smallest at the bisecting radial line BRL and largest at the bisecting circumferential line BCL, and similarly as large at the inner diameter 42 as well. Accordingly, the first and second set of dimples 58, 60, and the first and second waveform profiles 80, 82 have a variable axial height AH in both the radial direction (across BRL radially) as well as in the circumferential direction (around BCL circumferentially). This is largely because each first and second set of dimples 58, 60 open at the inner diameter 40 and outer diameter 42 at their axial-most extent, respectively. However, it is possible to vary the dimple structure depending on the desired crush characteristics. With the waveform profile 80, 82, which in this embodiment, has an undulating sinusoidal quality, the slope is greatest at the bisecting circumferential line BCL, particularly with the continuously changing curve structure 84.

The dimples 58, 60 are structured in the illustrated embodiments to have a curvilinear structure in the axial direction (e.g., the continuously changing curve 84), as well as in the radial direction, as shown in FIGS. 3 and 7, for example. It should be understood, however, that the dimples may be structured more linearly or angularly, such as having more of a ridge-like structure or an alternately shaped profile, depending on the desired implementation. In the illustrated embodiments, the first set of dimples comprises alternating first and second arc length extensions 90, 92, and the second set of dimples comprises alternating third and fourth arc length extensions 94, 96 (only some are labeled for clarity purposes). This arrangement provides for a more circular-shaped radial profile for each dimple, with the dimple sets 58, 60 opening up into the inner diameter 40 and the outer diameter 42, respectively. In accordance with one embodiment, the third and fourth arc length extensions 94, 96 are longer than the second arc length extensions 92. This arrangement can help spatially distribute the dimple sets 58, 60 around the inner diameter 40 and outer diameter 42, respectively, while maintaining alignment of axially opposing dimples along radial vectors (e.g., dimples 62, 64 along radial vector 50). As shown in FIG. 3, alternating dimples from each set 58, 60 are spaced by an angle θ, which in this embodiment is about 11.25°, and varies preferably between 5° and 20°, to cite one example range. This spacing and number of circumferential alternating dimples can keep the spacer 20 from wrinkling while providing enough variability in axial height AH to accommodate different set heights when installed. Additionally, for each of the dimples in this embodiment, the alternating first and second arc length extensions 90, 92 open in a first radial direction RD1, and the alternating third and fourth arc length extension 94, 96 open in a second, opposing radial direction RD2. This can help orient the maximum axial height AH1 at the inner and outer diameters 40, 42.

The spacer 20 can be configured with other features to help improve operational characteristics. For example, as shown in FIGS. 7 and 8, for example, tabs 98 may project outwardly from the outer diameter 42 to help control the amount of radial expansion when the spacer 20 is installed. As shown more particularly in FIG. 8, the tabs 98 are spaced and oriented such that at least some are located more toward the first axial direction AD1 on a first side of the bisecting circumferential line BCL and at least some others are located more in the second axial direction AD2 on a second side of the bisecting circumferential line BCL. This can be accomplished by orienting the tabs 98 on dimples that have different arc length extensions 94, 96.

Figure 9:
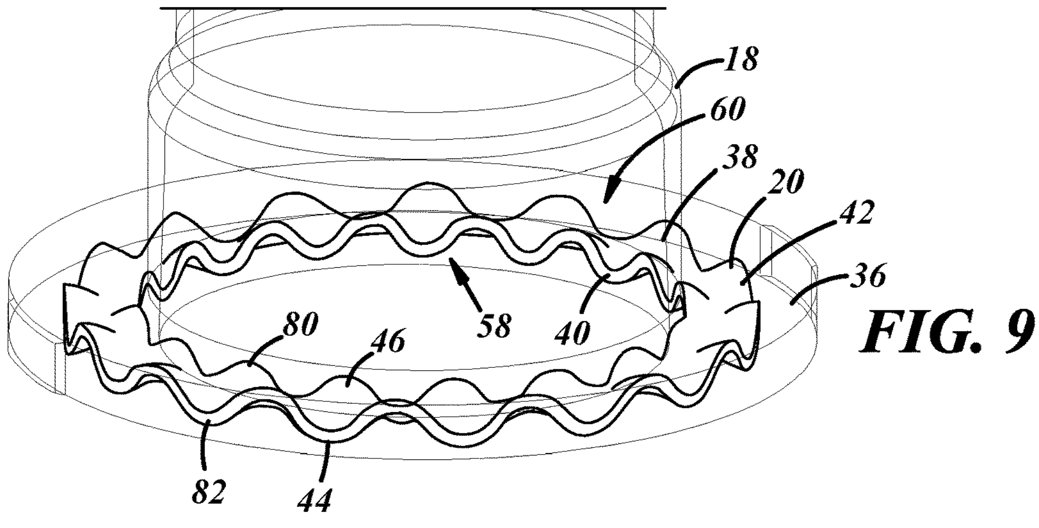
FIG. 9 is a perspective view of the spacer of FIGS. 3-6 embedded in a dust boot.
Figure 10:
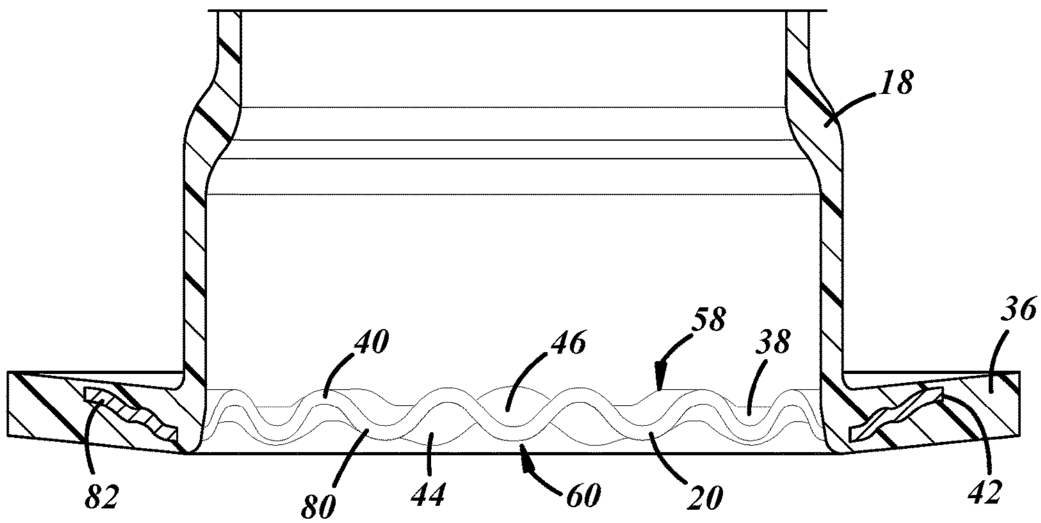
FIG. 10 is a cross-section view of the spacer and dust boot of FIG. 9.

The spacer 20 can be installed in different locations within the socket joint 10, with FIGS. 1 and 2 showing one example installation location and FIGS. 9 and 10 showing another example installation location. Other installation locations are certainly possible. In the embodiment of FIGS. 1 and 2, the spacer 20 is compressed between the spacing ring 34 (e.g., a first internal subcomponent) and the Belleville 32 (e.g., a second internal subcomponent). As shown more particularly in FIG. 2, the dimple sets 58, 60 create a plurality of first spaced contact portions 102 and second spaced contact portions 104 that contact the first internal subcomponent, and the second internal subcomponent, respectively. Other internal subcomponents are certainly possible, such as the bearing 30, a cover plate, the bore 22 of the housing 12 itself, just to cite a few examples. The first and second spaced contact portions 102, 104 extend circumferentially around the body 38 of the spacer 20 to provide discrete points of contact with the internal subcomponents. Additionally, as shown in FIG. 2, the first spaced contact portion 102 is aligned with one of the second spaced contact portions 104 along a radial vector (i.e., the radial vector at the plane of the cross-section). This arrangement extends circumferentially around the body 38 of the spacer 20.

In FIGS. 9 and 10, the spacer 20 is installed in the flange 36 of the dust boot 18. The spacer 20 may be situated on or adjacent the flange 36, or may be at least partially embedded within a fully elastomeric, radially extending flange. This can help retain the flange 36 and the dust boot 18 with respect to the bore 22 of the housing 12. The dust boot 18 may be installed within the bore 22, or on the outside of the housing 12. This spacer 20 arrangement can allow for the flat surface of the flange 36 to become compressed and provide a positive retention for the dust boot 18.

Figure 11:
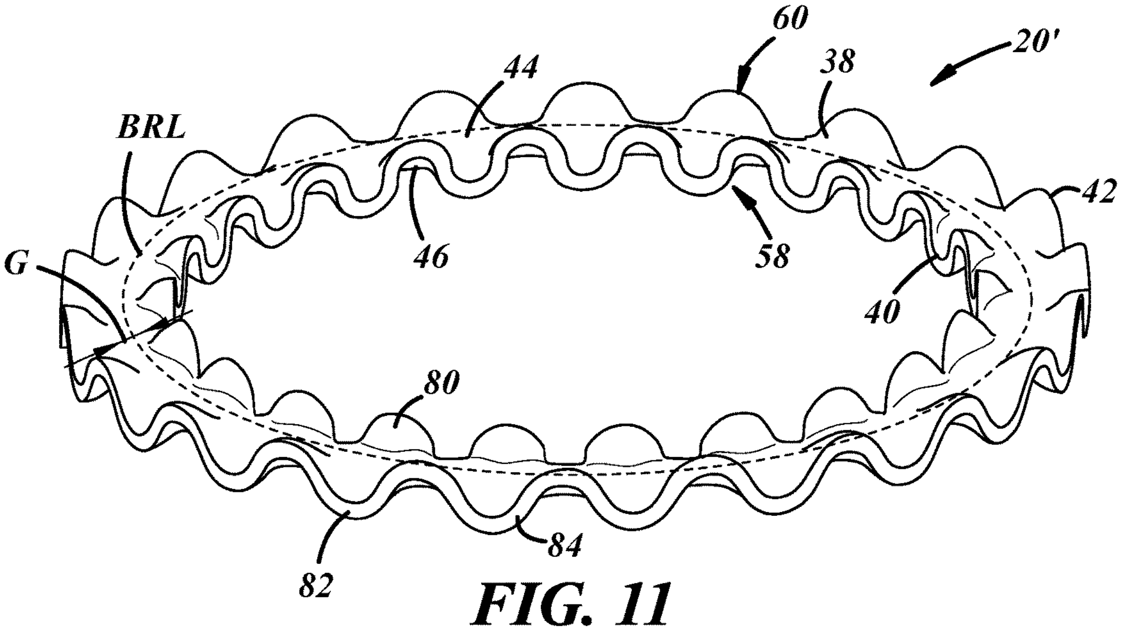
FIG. 11 is a perspective view of another embodiment of a spacer.
Figure 12:
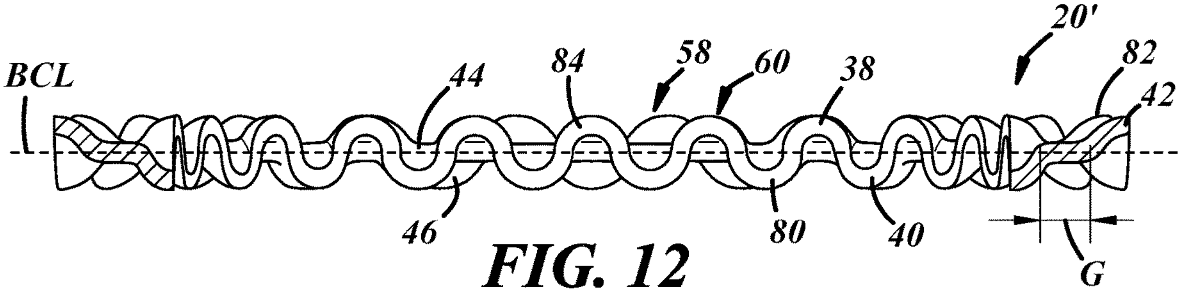
FIG. 12 is a cross-section view of the spacer of FIG. 11.

FIGS. 11 and 12 show another embodiment of a spacer 20'. In this embodiment, the slope of the continuously changing curve 84 is even greater as it crosses the bisecting circumferential line BCL, and the first and second dimple sets 58, 60 and the first and second waveform profiles 80, 82 are spaced by a larger gap G from the bisecting radial line BRL. This arrangement can impart more crushability at the inner diameter 40 and the outer diameter 42 as compared with a more central region of the spacer 20' along the bisecting radial line BRL. Other geometric and structural alterations to the spacer 20, 20' are certainly possible.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A spacer for a socket joint, comprising:

a body extending from an inner diameter to an outer diameter, the body having a plurality of radial vectors extending radially from the inner diameter to the outer diameter;

a first set of dimples with one or more dimples projecting in a first direction from the body; and a second set of dimples with one or more dimples projecting in a second direction from the body, wherein the first direction is different from the second direction, and wherein a first dimple from the first set of dimples and a second dimple from the second set of dimples are at least partially aligned along one radial vector of the plurality of radial vectors, wherein the first set of dimples comprises alternating first arc length extensions and second arc length extensions, wherein the second set of dimples comprises alternating third arc length extensions and fourth arc length extensions, and wherein one or more of the first arc length extensions, the second arc length extensions, the third arc length extensions, and the fourth arc length extensions open in a radial direction.

2. The spacer of claim 1, wherein the first direction is a first axial direction and the second direction is a second axial direction.

3. The spacer of claim 2, wherein the first axial direction and the second axial direction are opposite directions.

4. The spacer of claim 1, wherein the first set of dimples forms a first waveform profile and the second set of dimples forms a second waveform profile.

5. The spacer of claim 4, wherein the first waveform profile and the second waveform profile are at least partially offset.

6. The spacer of claim 4, wherein the body has a maximum axial height between a peak of the first dimple and a valley of the second dimple, and a bisecting circumferential line extends around the body circumferentially at a midpoint of the maximum axial height.

7. The spacer of claim 1, wherein the third and fourth arc length extensions are longer than the first arc length extensions.

8. The spacer of claim 1, wherein the first and second arc length extensions open in a first radial direction, and the third and fourth arc length extensions open in a second opposing radial direction.

9. The spacer of claim 1, wherein the body includes a plurality of tabs that extend from the outer diameter.

10. A socket joint, comprising: a spacer, a first internal subcomponent, and a second internal subcomponent, the spacer comprising:

a body extending from an inner diameter to an outer diameter, the body having a plurality of radial vectors extending radially from the inner diameter to the outer diameter;

a first set of dimples with one or more dimples projecting in a first direction from the body; and a second set of dimples with one or more dimples projecting in a second direction from the body, wherein the first direction is different from the second direction, and wherein a first dimple from the first set of dimples and a second dimple from the second set of dimples are at least partially aligned along one radial vector of the plurality of radial vectors;

wherein the spacer is compressed between the first internal subcomponent and the second internal subcomponent, the spacer having first spaced contact portions contacting the first internal subcomponent and second spaced contact portions contacting the second internal subcomponent, wherein the first spaced contact portions and the second spaced contact portions are aligned along at least some radial vectors of the plurality of radial vectors.

11. A dust boot having a flange, the dust boot comprising the spacer of claim 1 at least partially embedded in the flange.

* * * * *